(12) United States Patent
Wojciech et al.

(10) Patent No.: US 6,837,533 B2
(45) Date of Patent: Jan. 4, 2005

(54) HARDTOP VEHICLE ROOF WITH AT LEAST TWO RIGID ROOF PARTS

(75) Inventors: Wezyk Wojciech, Sindelfingen (DE); Andreas Hasselgruber, Eberdingen-Nussdorf (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/772,004

(22) Filed: Feb. 3, 2004

(65) Prior Publication Data

US 2004/0189040 A1 Sep. 30, 2004

Related U.S. Application Data

(63) Continuation-in-part of application No. 10/355,891, filed on Jan. 31, 2003, now abandoned.

(30) Foreign Application Priority Data

Aug. 2, 2001 (DE) .......................................... 101 37 465

(51) Int. Cl.[7] .................................................. B60P 7/02
(52) U.S. Cl. .................................... 296/107.17; 296/110
(58) Field of Search ........................ 296/107.17, 107.16, 296/107.2, 110

(56) References Cited

U.S. PATENT DOCUMENTS

| | | | | |
|---|---|---|---|---|
| 5,558,388 A | * | 9/1996 | Furst et al. ............... | 296/107.2 |
| 2002/0050727 A1 | * | 5/2002 | Hasselgruber et al. . | 296/107.17 |
| 2003/0042751 A1 | * | 3/2003 | Antreich ................ | 296/107.17 |

* cited by examiner

Primary Examiner—Joseph D. Pape
(74) Attorney, Agent, or Firm—Klaus J. Bach

(57) ABSTRACT

In a hardtop vehicle roof with rigid roof parts movable between a closed position in which the roof parts are disposed behind one another on a vehicle body to cover an interior vehicle space and a storage position in which they are disposed in a storage compartment behind the interior vehicle space, each of the roof parts is supported individually on the vehicle body by an operating mechanism by which it is movable between the closed and the storage position while remaining in the same orientation which it has in its closed position, the front roof parts being disposed in the storage compartment below the rear roof part.

5 Claims, 10 Drawing Sheets

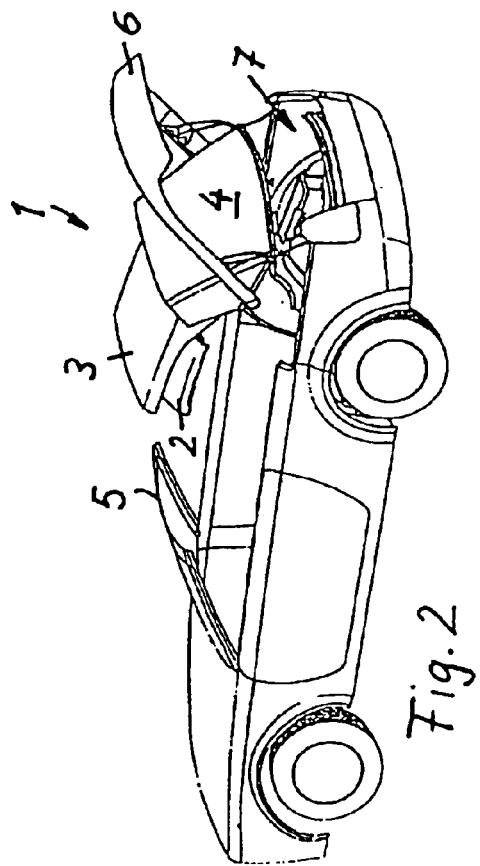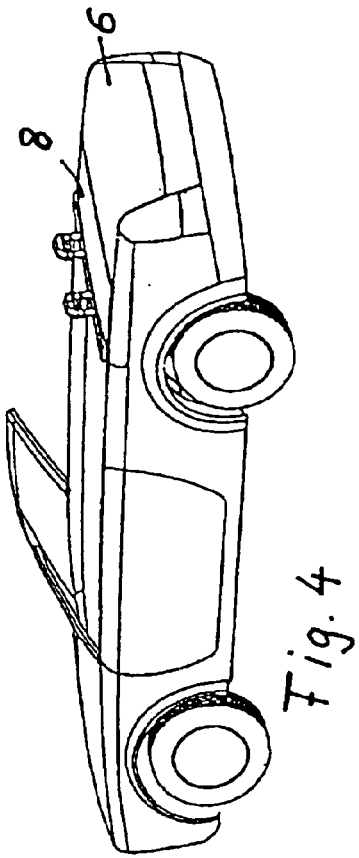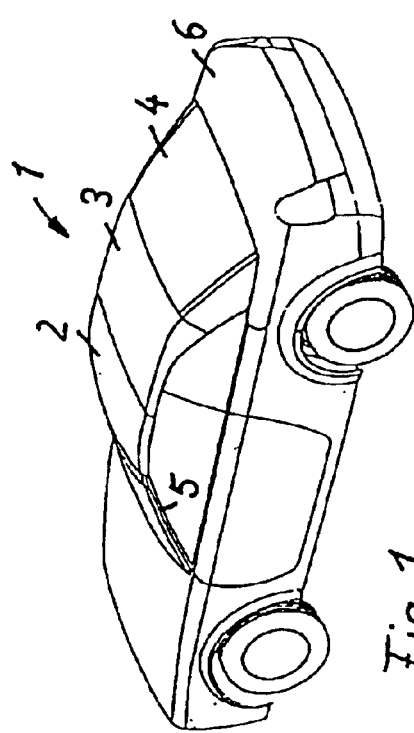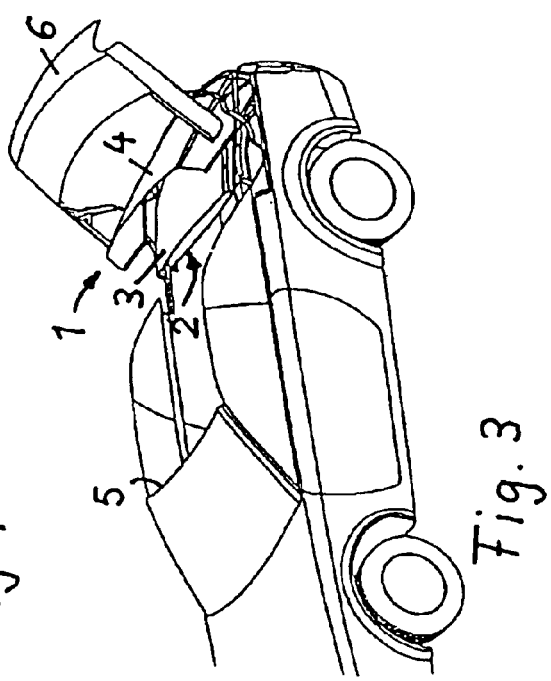

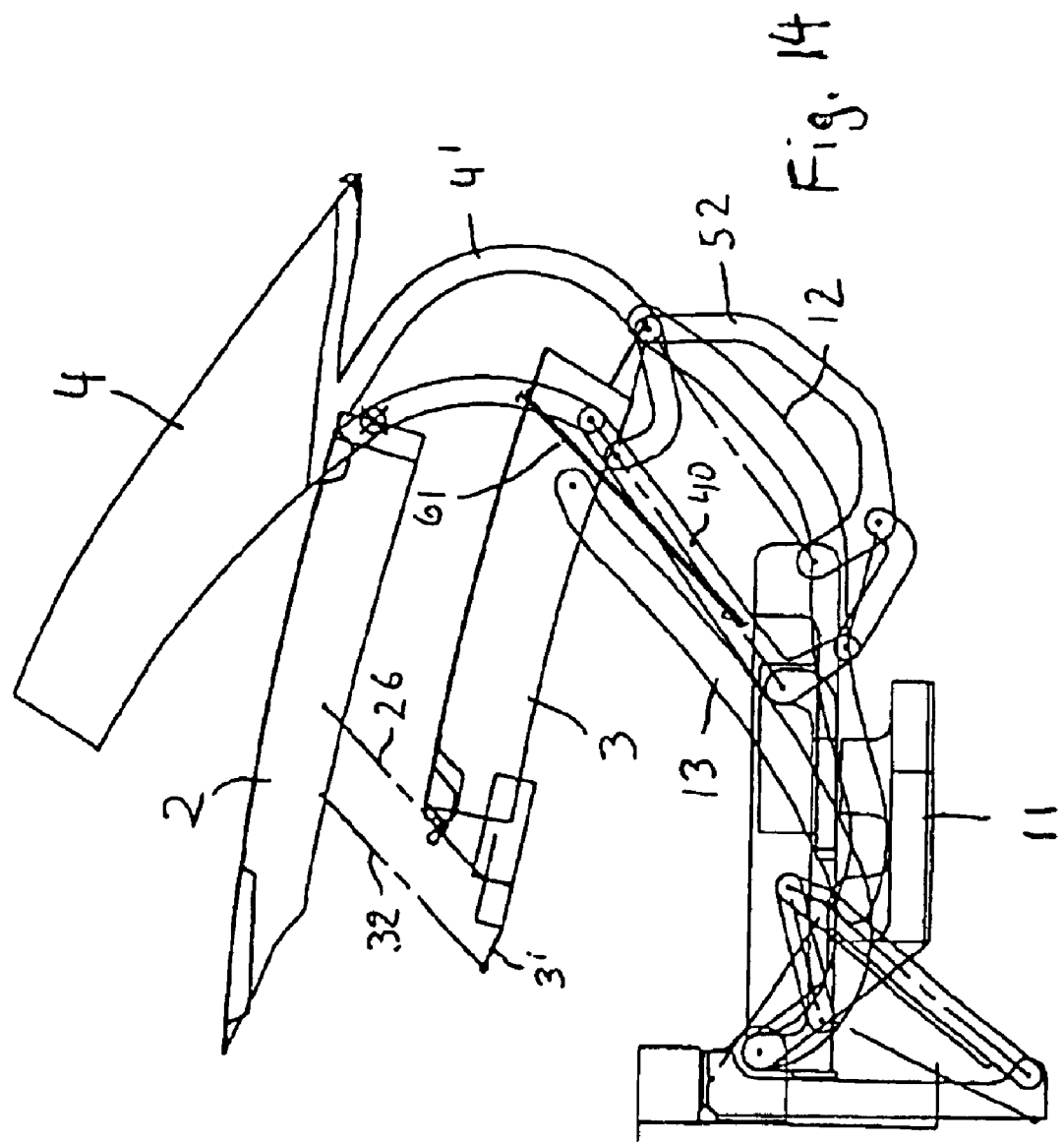

HARDTOP VEHICLE ROOF WITH AT LEAST TWO RIGID ROOF PARTS

This is a Continuation-In-Part Application of patent application Ser. No. 10/355,891 filed Jan. 31, 2003 now abandoned.

BACKGROUND OF THE INVENTION

The invention relates to a hardtop vehicle roof with at least two rigid roof parts, which are movable between a closed position in which they cover the vehicle interior, and an open position, in which they are disposed in a storage compartment, and which, in the closed position, are disposed behind the other in the longitudinal direction of the vehicle. Each roof part includes an operating mechanism by which it is connected to the vehicle body and can be operated independently of the other roof part between the closed and the storage positions in which the roof parts are disposed on top of one another.

EP 0 835 779 A1 discloses a hardtop which consists of three parts that are movable between a closed position, in which they cover the interior space of a vehicle and are disposed one after the other in the longitudinal vehicle direction, and a storage position, in which the roof parts are deposited in a storage compartment behind the interior vehicle space. The roof parts are joined to one another and are connected to the vehicle body by an operating linkage, by which the roof parts are pivoted during the transfer from the closed to the storage position such that the rear roof part is deposited in the storage compartment upside down that is that the bottom side thereof points upwardly. The front part is pivoted by 180° below the intermediate roof part and the packet of intermediate and front roof parts is folded onto the rear roof part so that the lower side of the intermediate roof part and the lower side of the rear roof part face each other in the storage compartment.

This arrangement has the disadvantage that the opposite facing undersides of the front and intermediate roof parts and the intermediate and rear roof parts are engaged with each other with their side edges like shell parts because of their opposite curvatures. As a result, they enclose a relatively large interior space, which is not usable and increases the need for storage space particularly in vertical direction.

DE 196 35 536 C1 discloses a convertible vehicle whose vehicle roof can be in a cabriolet and in a Landaulet configuration. The vehicle roof is in the form of a two part hard top wherein the rear roof part is pivotable between a closed position and a storage position and the front roof part is movable independently of the rear roof part into the storage compartment by way of an operating linkage. Because of the rearward pivoting of the rear roof part where the rear roof part is deposited in an upside down position and the parallel rearward movement of the front roof part onto the rear part, the inner sides of the front and rear roof parts face each other again. With the curvature of the roof parts, the roof parts again enclose an unusable volume and require a relatively large storage space.

DE 44 35 222 C1 discloses a removable vehicle roof comprising a front roof part which is slidable, an intermediate roof part in its open position and a rear roof part with an integrated rear window panel. The rear roof part and the intermediate roof part are coupled to the vehicle body each by a separate operating mechanism. For transforming the vehicle to a cabriolet configuration, first the rear roof part is lifted and displaced forwardly until the rear roof part and the intermediate roof part with the front roof part disposed underneath are arranged on top of one another. In this position, the two roof parts are interlocked and the roof packet formed in this way is moved back into the rear storage compartment. The front roof part is moved into a position below or above the intermediate roof part.

In this arrangement, the intermediate roof part and the rear roof part have their independent operating mechanisms by way of which they are mounted to the vehicle body. However, the arrangement as disclosed cannot provide only for an open convertible configuration.

It is the object of the present invention to provide a hardtop vehicle roof, which can be deposited in a storage compartment with a relatively small storage volume. Furthermore, the roof should be movable to a convertible vehicle configuration, to a Targa configuration and expediently also a Landaulet configuration.

SUMMARY OF THE INVENTION

In a hardtop vehicle roof with rigid roof parts movable between a closed position in which the roof parts are disposed behind one another on a vehicle body to cover an interior vehicle space and a storage position in which they are disposed in a storage compartment behind the interior vehicle space, each of the roof parts is supported individually on the vehicle body by an operating mechanism by which it is movable between the closed and the storage position while remaining in the same orientation which it has in its closed position, the front roof parts being disposed in the storage compartment below the rear roof part.

Each roof part of the hardtop vehicle roof according to the invention is movable by an operating mechanism between a closed position and an open position in a parallel path of movement wherein the parts remain oriented in the same way as they are in the closed position that is with their top sides disposed on top—in contrast to a prior art mechanism by which the roof parts are pivoted by 180° into the storage compartment. A translatory movement of the roof parts is sufficient. The translatory path of movement may also be curved as long as the roof parts are deposited in the storage compartment in an orientation in which the top part of the roof parts face upwardly. In this way, the roof parts can be stacked in the storage compartment behind the interior vehicle space on top of one another—all in the same orientation—in which the curvature of the parts permits a tight packing providing for a small storage volume as all parts are curved in the same sense.

Each roof part is provided with an operating mechanism by which each roof part is directly coupled to the vehicle body. The operating mechanisms are operable independently from each other so that the roof parts can be moved independently. In this way, in addition to the cabriolet configuration, a Landaulet configuration of the vehicle can be obtained wherein the rear roof part is removed but the front roof part remains in place. Also, a Targa configuration can be obtained wherein the intermediate roof part is removed and the rear roof part remains in place.

If the hardtop comprises three rigid roof parts, the intermediate roof part is expediently deposited in the storage compartment at the bottom and, furthermore, the intermediate roof part is deposited below the rear roof part so that the roof parts are arranged in the storage compartment from the bottom to the top in the order front roof part, intermediate roof part and rear roof part. This order has the advantage that, for the transfer from the closed to the storage position all three roof parts of the hardtop can be moved at the same time which is not possible if the roof parts are deposited in the opposite order because of possible collisions of the movement path of the rear and the intermediate or, respectively, the front roof parts.

The operating mechanism for each roof part may be a four-link mechanism or there may be joint mechanisms with superimposed linear movement. With such operating mechanisms, the roof part can be moved laterally and a superimposed pivot movement can be obtained for each roof part while the position of the parts relative to the vehicle body remains the same that is the roof tops face upwardly.

The invention will be described below in greater detail on the basis of the accompanying drawings:

BRIEF DESCRIPTION OF THE DRAWINGS

FIG. 1 shows, in a perspective view, a passenger car with a hardtop vehicle roof in a closed position, FIG. 2 shows the passenger car with the roof in an intermediate position during the opening of the roof.

FIG. 3 shows the car in a cabriolet configuration with the hardtop disposed in a rear storage compartment shortly before the reaching the final storage position, FIG. 4 shows the passenger car in a cabriolet configuration, FIG. 14 shows the whole roof in an intermediate position further advanced than the position shown in FIG. 13.

DESCRIPTION OF A PREFERRED EMBODIMENT

Figure 5:
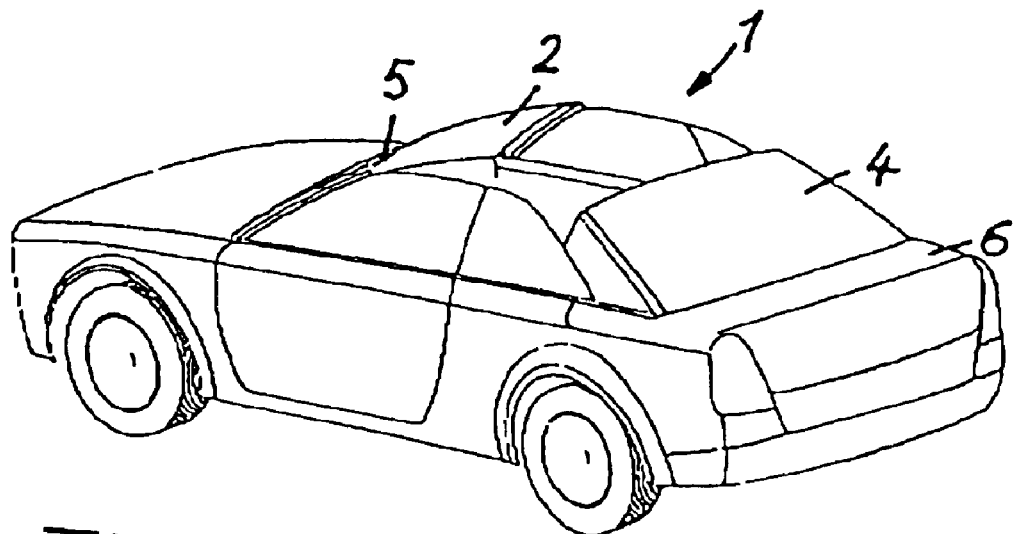
FIG. 5 shows the passenger car in a Targa configuration.

In the following figures, identical components are designated by the same reference numerals.

The convertible vehicle as shown in FIG. 1 comprises a hardtop vehicle roof 1, which includes three rigid roof parts 2, 3, and 4. In the closed position of the roof as shown in FIG. 1, the roof parts 2, 3, 4 are disposed one behind the other in the longitudinal vehicle direction. When in its closed position, the front roof part 2 is firmly engaged with the windshield frame 5 by a locking mechanism. The rear roof part 4 comprises the side support columns as well as the rear window panel disposed between the support columns.

For the transfer of the hardtop 1 to the storage position, that is, when the hardtop is to be deposited in the rear storage compartment, the trunk lid 6 is pivoted open and at the same time moved to the rear in order to provide sufficient clearance for a collision-free movement of the vehicle roof into the storage compartment.

As shown in FIGS. 2 and 3, each roof part 2, 3, and 4 is directly supported on the vehicle body by its own operating mechanism which permits movement of each roof part independently of the other roof parts. During the transition of the hardtop from the closed position to the storage position, the movement of the three roof parts 2, 3, and 4 is expediently synchronized. By coordination of the movements of the operating mechanism, the respective movement procedures can be executed successively rapidly so that the roof parts reach their storage positions securely in a short time. The coordination of the operating mechanism is performed by a control unit, which supplies the appropriate control signals to the operating members of each operating mechanism.

During the movement of the roof parts 2, 3, and, respectively, 4 to the storage compartment, the roof parts remain oriented as they are in the closed position, that is, with their top surfaces facing upwardly. In the storage position in the rear storage compartment 7 the rear roof part 4 is disposed on top and the front roof part is disposed at the bottom; the intermediate roof part 3 is disposed between the front and the rear roof parts 2, 4.

The operating mechanisms of the roof parts 2, 3 and 4 are in the form of four joint operating mechanisms or joint operating mechanisms with superimposed linear movement and provide for a lateral displacement and lowering movement while maintaining the orientation of each roof part between the closed and the storage positions.

As can be seen from FIG. 4 showing the car in a cabriolet configuration with the roof deposited in the storage compartment, the storage compartment for receiving the hardtop roof may be closed by a storage compartment cover 8 which at the same time forms a rear storage shelf when the roof is closed. The cover 8 is moveable relative to the trunk lid 6.

In the Targa configuration as shown in FIG. 5, the front roof part 2 and the rear roof part 4 are in their respective closed positions, but the intermediate roof part 3 is removed and lowered into the storage compartment. As a result, there is an opening of limited size formed in the vehicle roof. It may however be expedient to deposit in the Targa configuration, the front roof part 2 in the storage compartment and to leave the intermediate roof part 3 in its closed position. It is also possible to move both the front roof part 2 and the intermediate roof part 3 into the storage compartment for providing the Targa configuration. This results in a larger roof opening.

Figure 6:
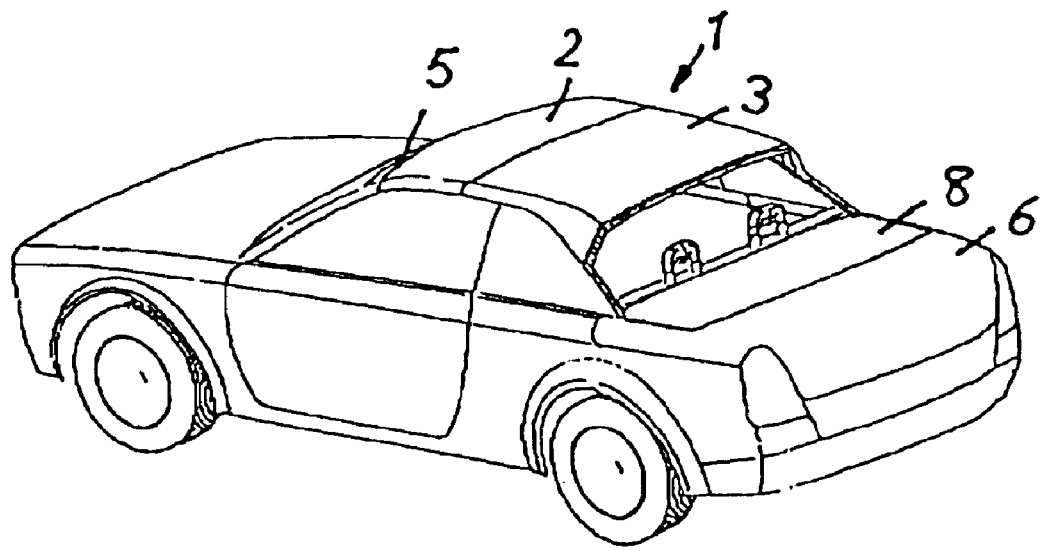
FIG. 6 shows the passenger car in a Landaulet configuration.

FIG. 6 shows a car in the Landaulet configuration, wherein the front roof part 2 and the intermediate roof part 3 are in the closed position whereas the rear roof part is deposited in the storage compartment. It is also possible to remove also the intermediate roof part and store it in the storage compartment in order to increase the roof opening in this configuration.

FIGS. 7 to 14 show the operating mechanism for the roof. Since there are separate operating mechanisms for the intermediate and front roof parts on one hand, and the rear roof part on the other, and these operating mechanisms are overlapping, for clarity, the operating mechanisms for the intermediate and front roof parts and for the rear roof part will first be shown and described separately.

Figure 7:
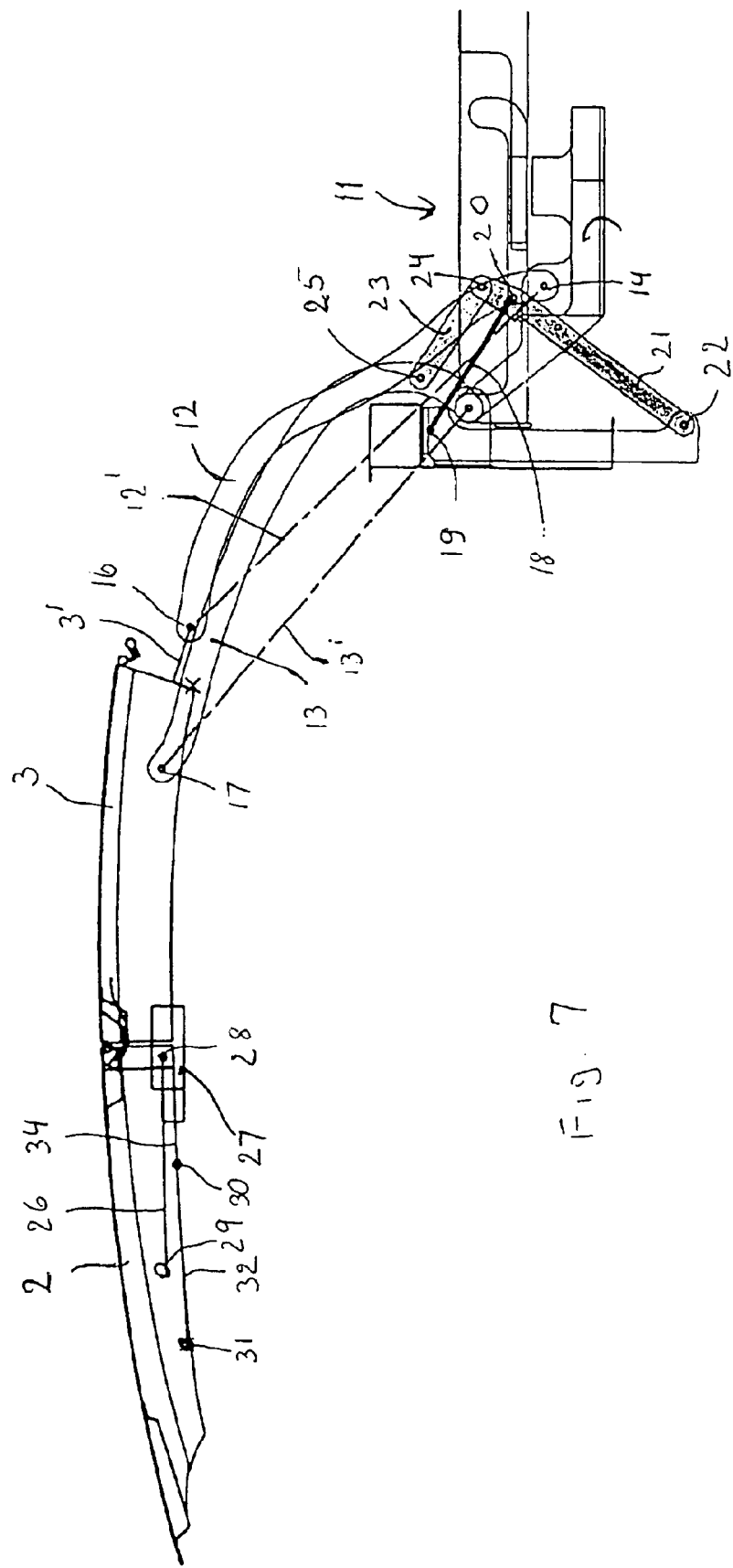
FIG. 7 shows the operating mechanism for the front and intermediate roof parts.

Referring to FIG. 7, the intermediate roof part 3 is supported on a vehicle body-mounted console 11 by support arms 12 and 13, which are curved in accordance with the shape of the vehicle roof. Their straight line connections are indicated by the dash-dotted lines 12' and 13'. The support arm 12 is pivotally supported on the console at a joint 14 and the support arm 13 is pivotally supported on the console 11 by a joint 15. At their opposite ends, the support arm 12 is connected by way of a joint 16 to an extension 3' of the intermediate roof part 3 and the support arm 13 is connected by a joint 17 to the intermediate roof part 3.

The support arms 12 and 13 are operated by a drive cylinder 18, which is indicated by a solid line and which is connected at one end by a joint 19 to the console 11. At its opposite end the drive cylinder 18 is connected by a joint 20 to an operating arm 21, which is pivotally supported at one end on the console 11 at a pivot joint 22. The opposite end of the operating arm 21 is connected by a joint 24 to a link 23, by which the operating arm 21 is linked to the support arm 12 at a joint 25 for actuating the support arms 12 and 13 and operating the intermediate vehicle roof part 3.

The front roof part 2 is supported on the intermediate roof part 3 by a parallel arm support arrangement including support arms 26 and 27, which are operated by a motor 27 independently of the drive 18 for the intermediate roof part 3.

The support arm 26 is supported at one end by a pivot joint on the motor 27, which is mounted on the intermediate roof part 3. The opposite end of the support arm 26 is connected to the front roof part 2 by a pivot joint 29. The support arm 27 is pivotally supported at one end on an extension 3" of the intermediate roof part 3 by way of a pivot joint 30. The other end of the support arm 32 is pivotally connected to the front roof part 2 by a pivot joint 31.

Figure 8:
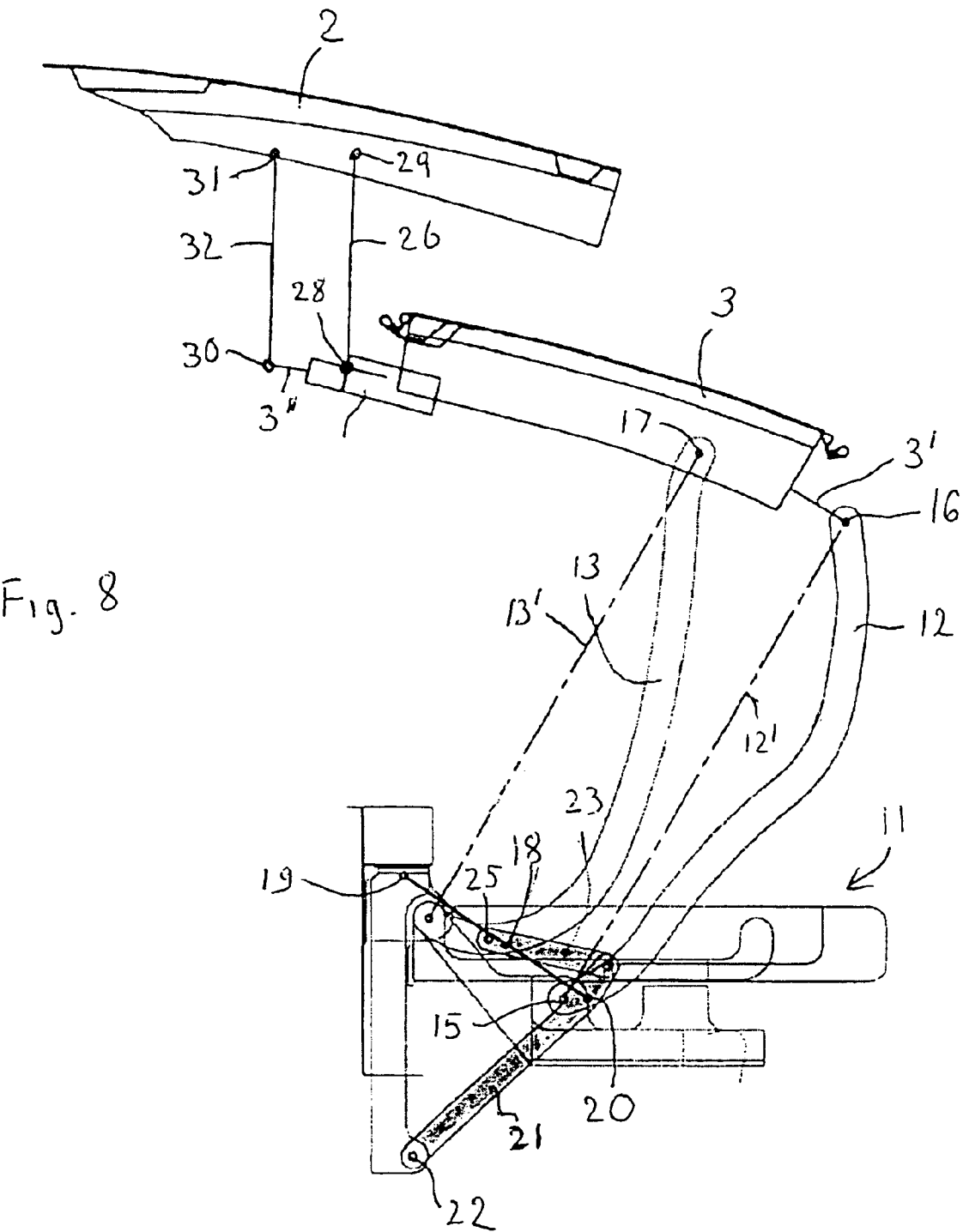
FIG. 8 shows the front and intermediate roof parts in an intermediate position between the closed position shown in FIG. 7 and an open position.

The connection is more readily apparent from FIG. 8, which shows the intermediate and front roof parts in a partially open position. In FIG. 8, all the reference numerals of FIG. 7 have been inserted so as to clearly indicate the various components in a different position relative to one another.

Figure 9:
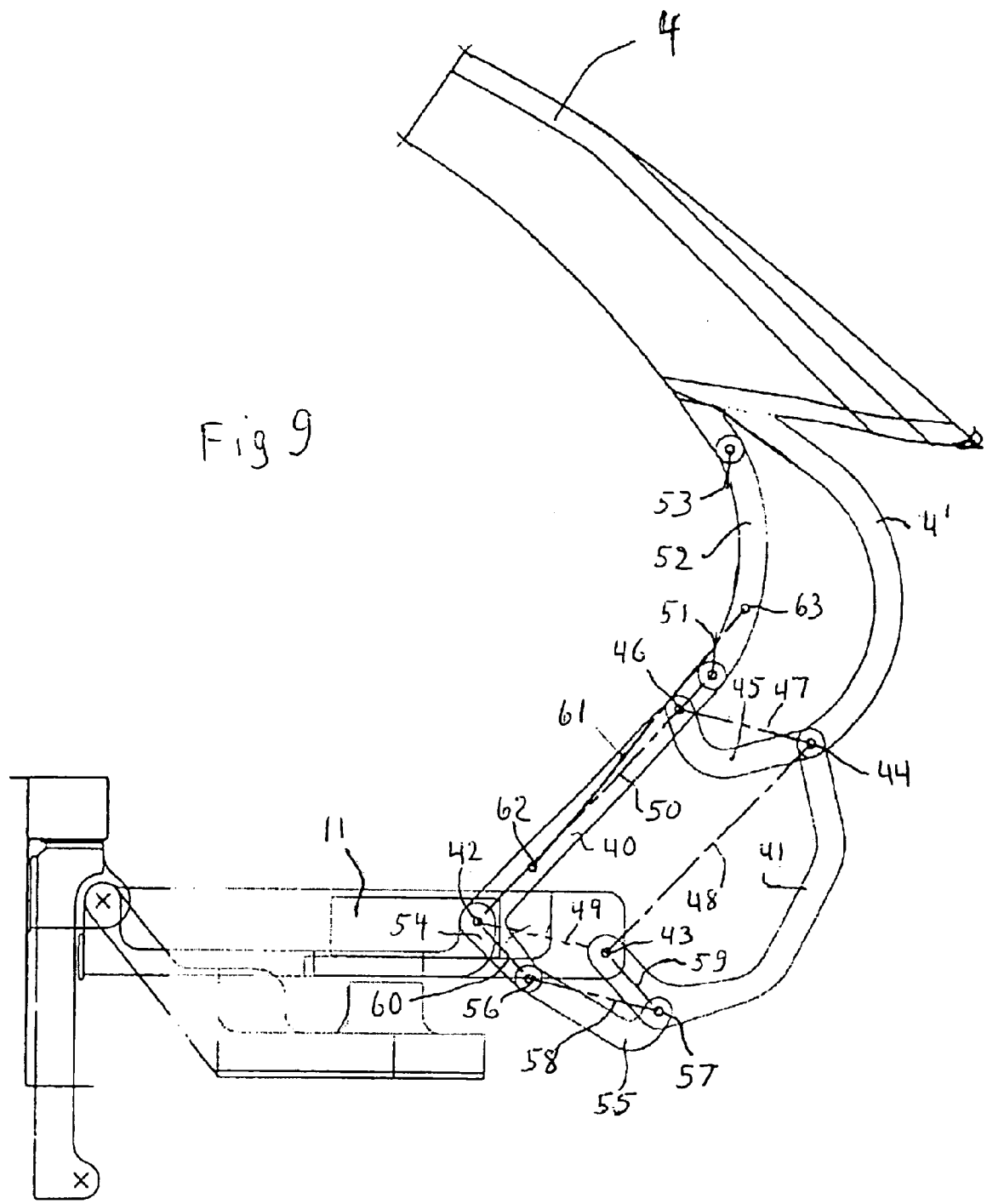
FIG. 9 shows the operating mechanism for the rear roof part with the rear roof part in an intermediate raised position.

FIG. 9 shows the rear roof part in raised position during opening of the roof. The operating mechanism for the rear roof part comprises parallel arms 40 and 41, which are pivotally supported on the console 11 by pivot joints 42 and 43, respectively. The arm 41 is connected at its opposite end to an extension 4' of the rear roof part 4 by a pivot joint 44 and connected to the parallel arms 40 by a connecting link 45 extending between the pivot joint 44 and a pivot joint 46 on the parallel arm 40 so that a parallelogram type operating link structure as indicated by the dash-dotted lines 47, 48, 49, and 50 is formed. The parallel arm 40 extends beyond the joint 46 with the connecting link 45 and, at its projecting end, is connected by a pivot joint 51 to a link 52 extending to the rear vehicle roof 4 to which the link 52 is connected by a pivot joint 53.

At its support end at the console 11, the support arm 40 has an angled extension 54 which is linked to the support arm 41 by a connecting link 55 via joints 56 and 57 to control the movement of the support arm 41 by way of a parallelogram type arrangement as indicated by the dashed lines 58, 59, 49 and 60.

The operating mechanism is actuated by an operating cylinder 61, which is connected to the support arm 40 at the joint 62 and to the link 52 at a joint 63 and which is schematically indicated by a solid line.

Figure 10:
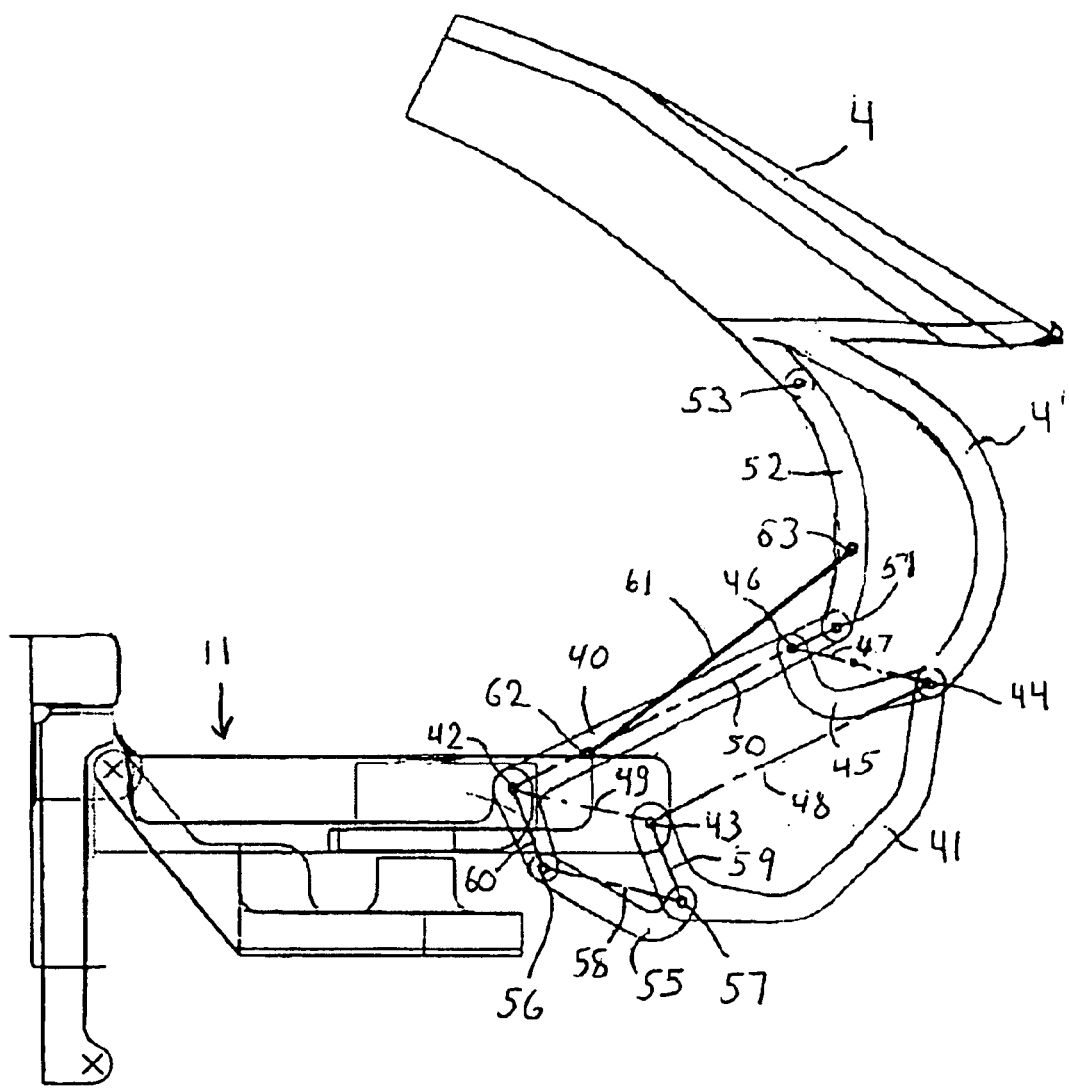
FIG. 10 shows the rear roof part in an intermediate position further advanced in the opening direction than is shown in FIG. 9.

FIG. 10 shows the rear roof part in a slightly different, advanced opening position to show the movements of the components relative to one another. In FIG. 10, the reference numerals of FIG. 9 are inserted to clearly show the various parts.

Figure 11:
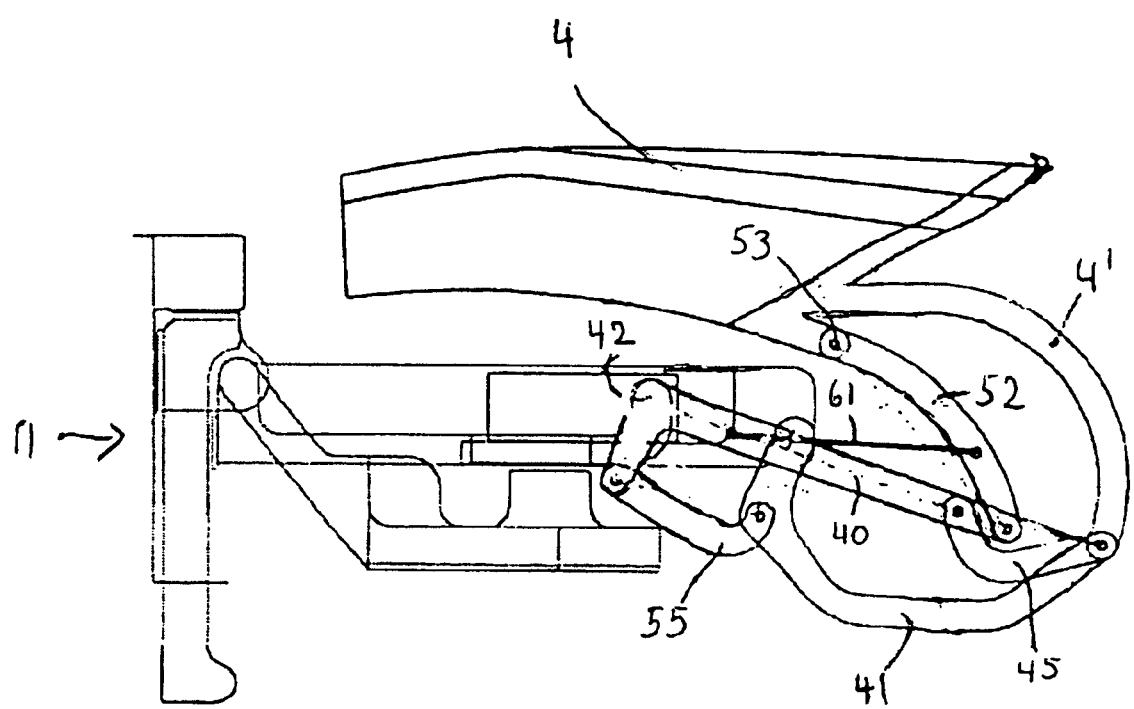
FIG. 11 shows the rear roof part in a storage position.

FIG. 11 shows the rear roof part 4 in the storage position.

Figure 12:
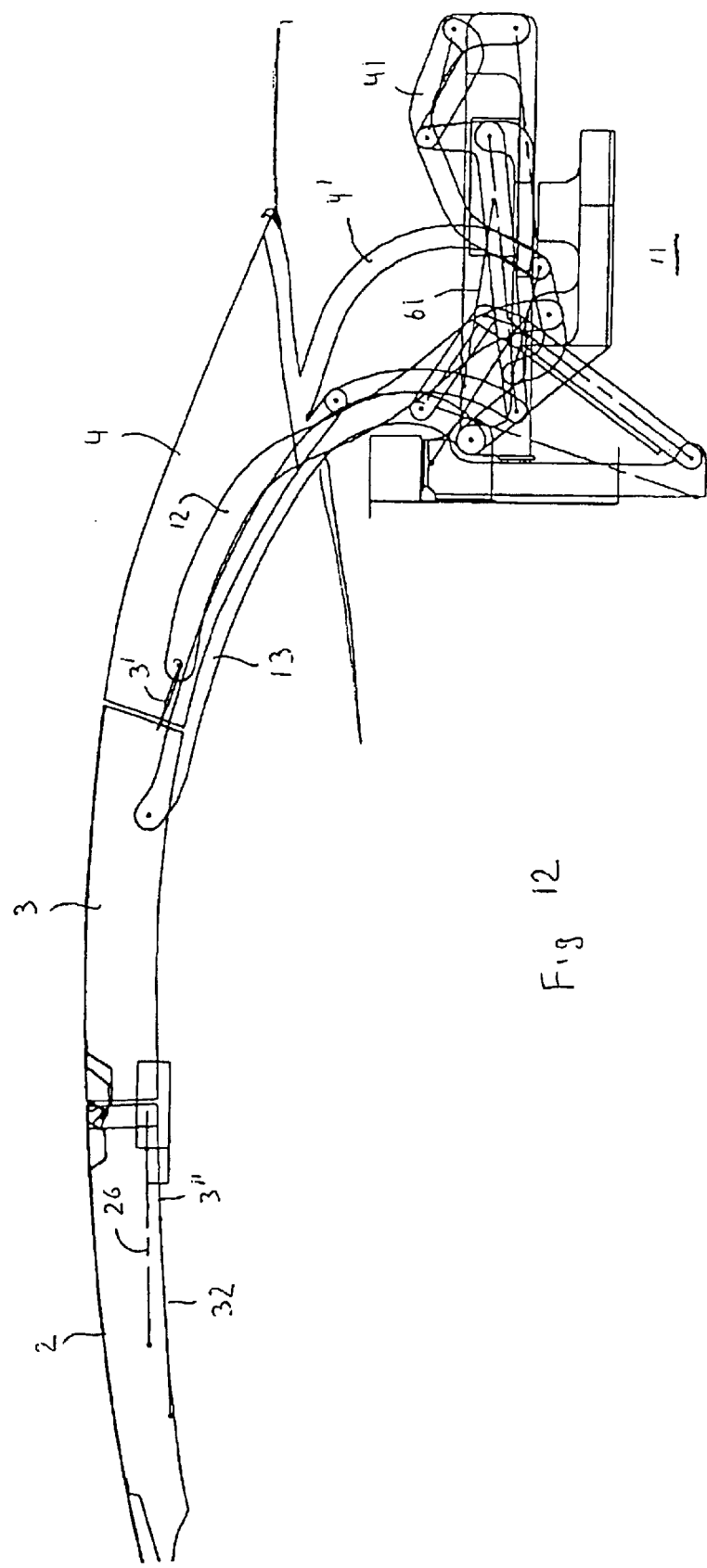
FIG. 12 shows the whole roof in a closed position, the operating mechanism components being indicated by the reference numerals used in FIGS. 7–10.

FIG. 12 shows the whole roof in the closed position, in which it covers the interior of a vehicle.

Figure 13:
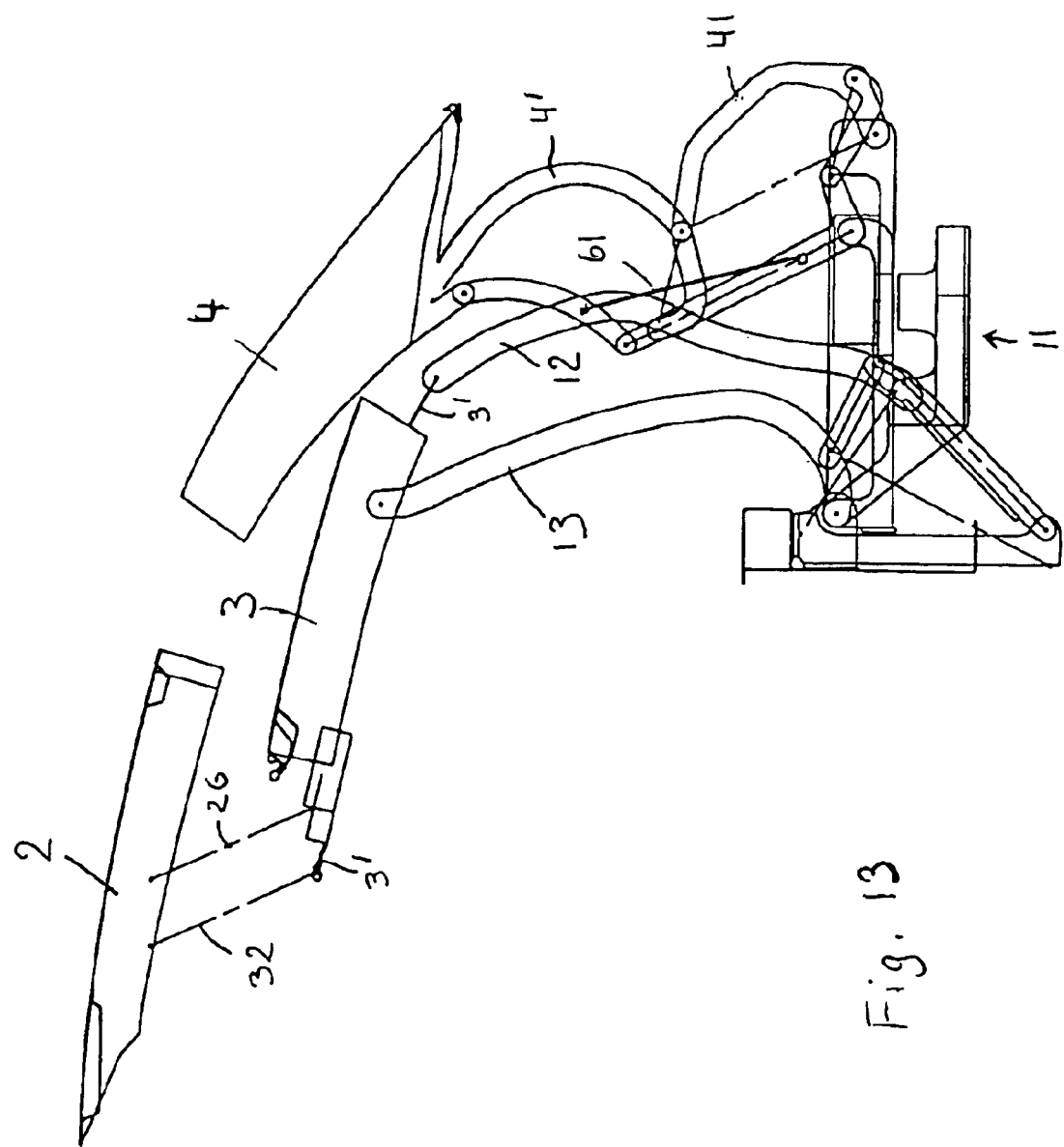
FIG. 13 shows the whole roof in an intermediate position during opening.

The operating mechanism for the different roof parts are independently controlled in order to provide for the different roof configurations as shown in FIGS. 1–6. The operating mechanism for the rear roof part 4 is such that, upon opening, it first raises the rear roof part 4 to the position as shown in FIG. 13. In this position, the front and/or intermediate roof parts 2 and 3 can be moved into the rear storage compartment (FIG. 2, FIG. 13), underneath the rear roof part 4. The rear roof part 4 can then again be returned to its closed position or it can also be moved into the storage compartment on top of the front and intermediate roof parts 2 and 3. FIG. 14 shows the roof parts in more advanced stages during the movement of all the roof parts into the storage compartment.

The description and the drawings are directed to a three-part hardtop vehicle roof. However, a car with a two-part hardtop vehicle roof may also be provided including a front roof part and a rear roof part, which car can be closed or converted to cabriolet, Targa and Landaulet configurations.

What is claimed is:

1. A hardtop vehicle roof with three rigid roof parts movable between a closed position, in which they cover an interior space of a vehicle body, and a storage position, in which they are disposed in a storage compartment behind said interior space, said rigid roof parts including a front, an intermediate and a rear roof part, each having a top surface and being disposed on the vehicle body in the closed position of the vehicle roof behind one another in the direction of a longitudinal vehicle axis, each of said rigid roof parts being individually supported on the vehicle body by a separate operating mechanism so as to be movable thereby between the closed position and the storage position, in which each roof part is deposited with its top surface facing upwardly that is in the same orientation which it has in its closed position, such that said rigid roof parts are accommodated in the storage compartment stacked on top of, and closely adjacent, one another, said vehicle roof top having cabriolet, Targa and Landaulet configurations, said rear roof part being deposited in said storage compartment and the other roof parts being in a closed position to provide said Landaulet configuration said intermediate roof part being deposited in said rear storage compartment and the roof parts being in a closed position to provide said Targa configuration and all roof parts being deposited in said storage compartment to provide said cabriolet configuration.

2. A hardtop vehicle roof according to claim 1, wherein said intermediate roof part is deposited in said storage compartment below said rear roof part.

3. A hardtop vehicle roof according to claim 2, wherein said front roof part is deposited in said storage compartment below said intermediate roof part.

4. A hardtop vehicle roof according to claim 1, wherein each of said separate operating mechanisms is a four joint mechanism.

5. A hardtop vehicle roof according to claim 1, wherein each of said separate operating mechanisms is a four joint mechanism with superimposed linear movement.

* * * * *